United States Patent
Takeda et al.

(10) Patent No.: US 9,975,413 B2
(45) Date of Patent: May 22, 2018

(54) WEATHERSTRIP FIXING STRUCTURE

(71) Applicant: NISHIKAWA RUBBER CO., LTD., Hiroshima (JP)

(72) Inventors: Kazuyuki Takeda, Hiroshima (JP); Tatsuya Nagai, Hiroshima (JP); Daisuke Nakazato, Hiroshima (JP); Hisatoshi Kinoshita, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 0 days. days.

(21) Appl. No.: 15/422,731

(22) Filed: Feb. 2, 2017

(65) Prior Publication Data

US 2017/0225555 A1    Aug. 10, 2017

(30) Foreign Application Priority Data

Feb. 4, 2016   (JP) ................................ 2016-019578

(51) Int. Cl.
| | |
|---|---|
| *E06B 7/16* | (2006.01) |
| *B60J 10/86* | (2016.01) |
| *E06B 3/36* | (2006.01) |
| *E06B 7/23* | (2006.01) |
| *B60J 10/24* | (2016.01) |

(52) U.S. Cl.
CPC .............. *B60J 10/86* (2016.02); *B60J 10/24* (2016.02); *E06B 3/36* (2013.01); *E06B 7/2305* (2013.01)

(58) Field of Classification Search
CPC ............ B60J 10/24; E06B 3/36; E06B 7/2305
USPC .............................................. 49/492.1, 493.1
See application file for complete search history.

(56) References Cited

U.S. PATENT DOCUMENTS

| | | | | |
|---|---|---|---|---|
| 4,864,774 | A * | 9/1989 | Onishi .................... | B60J 10/235 49/440 |
| 5,111,617 | A * | 5/1992 | Saiga ....................... | B60J 10/00 49/475.1 |
| 5,376,423 | A * | 12/1994 | Wiegand ............... | F16B 7/0426 24/289 |
| 6,112,468 | A * | 9/2000 | Aritake .................... | B60J 10/86 49/475.1 |
| 6,598,348 | B2 * | 7/2003 | Palicki ..................... | B60J 10/30 49/479.1 |
| 8,667,737 | B2 * | 3/2014 | Hughes, Jr. .............. | B60J 10/86 49/475.1 |
| 8,667,738 | B2 * | 3/2014 | Kondo ..................... | B60J 10/76 49/440 |

(Continued)

FOREIGN PATENT DOCUMENTS

| | | | | |
|---|---|---|---|---|
| DE | 102007045656 A1 * | 4/2009 | ............. | B60J 10/24 |
| DE | 102007045659 A1 * | 4/2009 | ............. | B60J 10/24 |

(Continued)

*Primary Examiner* — Jerry E Redman
(74) *Attorney, Agent, or Firm* — Renner, Otto, Boisselle & Sklar, LLP

(57) ABSTRACT

A portion of a peripheral wall of a hollow portion receiving a compression load when a door is closed has a slit-shaped core removal hole through which a core member used to mold the inner surface of the hollow portion is removed from the hollow portion. An attachment member has an insertion plate portion to be inserted into the core removal hole. The thickness of the insertion plate portion is set to be substantially equal to the width of an opening of the core removal hole.

4 Claims, 9 Drawing Sheets

(56) References Cited

U.S. PATENT DOCUMENTS

| | | | | |
|---|---|---|---|---|
| 8,726,576 B2* | 5/2014 | Kobayashi | ............ | B60J 10/042 49/441 |
| 2004/0010976 A1* | 1/2004 | Langemann | ............ | B60J 10/18 49/493.1 |
| 2004/0216384 A1* | 11/2004 | Teramoto | ................ | B60J 10/24 49/479.1 |
| 2005/0053761 A1* | 3/2005 | Murase | ................ | B60R 21/205 428/122 |
| 2007/0175102 A1* | 8/2007 | Teramoto | ................ | B60J 10/30 49/441 |
| 2012/0036788 A1* | 2/2012 | Purdy | .................... | B60J 10/84 49/493.1 |
| 2015/0068128 A1* | 3/2015 | Baxter | ................... | B60R 13/06 49/480.1 |

FOREIGN PATENT DOCUMENTS

| | | | | | |
|---|---|---|---|---|---|
| FR | 2863211 A1 * | 6/2005 | | ............. | B60J 10/24 |
| JP | 2568228 Y2 | 1/1998 | | | |
| JP | 2003-72386 A | 3/2003 | | | |
| JP | 2003-80951 A | 3/2003 | | | |
| WO | WO-2016202699 A1 * | 12/2016 | | ............. | B60J 10/16 |

* cited by examiner

WEATHERSTRIP FIXING STRUCTURE

CROSS-REFERENCE TO RELATED APPLICATION

This application claims priority to Japanese Patent Application No. 2016-019578 filed on Feb. 4, 2016, the entire disclosure of which is hereby incorporated by reference.

BACKGROUND

The present disclosure relates to a weatherstrip fixing structure for fixing a weatherstrip used to seal the gap between a vehicle door and the edge of a vehicle body opening.

A weatherstrip is arranged in the vicinity of the edge of a vehicle door, for example, to seal the gap between the door and the edge of a vehicle body opening. Examples of this type of known weatherstrips include a weatherstrip having an elongated hollow portion that extends along the edge of a door and made of an elastic material as disclosed in Japanese Unexamined Patent Publication No. 2003-72386, Japanese Utility Model Registration No. 2568228, and Japanese Unexamined Patent Publication No. 2003-80951. The hollow portion is interposed between the edge of the door and the edge of a vehicle body opening. When the door is closed, the hollow portion is elastically deformed by being sandwiched between the edge of the door and the edge of the vehicle body opening. This provides good sealability.

In each of these patent documents, the weatherstrip includes an extruded part and a molded part, which has a hollow portion molded with molds. During this molding process, a core member is used to form the inner surface of the hollow portion. For this reason, the hollow portion has a slit-shaped core removal hole which is formed somewhere along the circumference of the hollow portion and through which the core member is removed after the molding process. The core removal hole is closed with an adhesive.

To fix a weatherstrip to a door, an elongated attachment member (with an optional length of 30-100 cm, for example) separate from an extruded weatherstrip body may be used while being coupled to the weatherstrip body as disclosed in Japanese Unexamined Patent Publication No. 2003-80951, for example. The attachment member has a plate-like portion fixed to the extruded weatherstrip body, and a resilient head protruding from the plate-like portion. The weatherstrip may be fixed to the door by fastening the resilient head into an attachment hole of the door.

SUMMARY

If a hollow portion of a molded part is molded with molds as described above, a core member will be used. Thus, a core removal hole passes through the peripheral wall of the hollow portion. To address this problem, the core removal hole may be closed with an adhesive as in Japanese Unexamined Patent Publication No. 2003-72386 and Japanese Utility Model Registration No. 2568228. This, however, causes the following problem.

Specifically, since the core removal hole is used to remove the core member after the molded part has been molded, the core removal hole forms the shape of a slit having a predetermined width corresponding to the thickness of a root portion of the core member. Thus, if an attempt is made to close the core removal hole with an adhesive, two edges of the core removal hole facing each other will be bonded together. At this time, the hollow portion has to be deformed so that both of the edges of the core removal hole are brought closer to each other by the predetermined width. This causes the shape and size of the hollow portion to be different from those of the hollow portion that has just been molded.

The shape and size of the hollow portion affect the sealability, and thus usually have to be strictly determined. For this reason, in each of Japanese Unexamined Patent Publication No. 2003-72386 and Japanese Utility Model Registration No. 2568228, the molded part must be molded such that the shape and size of the hollow portion will be suited to providing good sealability after the core removal hole has been closed with an adhesive. This makes it complicated to design the shape of the molded part (i.e., to prepare a drawing of the shape).

If an adhesive is used as in Japanese Unexamined Patent Publication No. 2003-72386 and Japanese Utility Model Registration No. 2568228, the need arises to apply the adhesive. This may reduce workability. In addition, the application of the adhesive to an unnecessary region, for example, may degrade the appearance of the weatherstrip. To address this problem, an elongated-plate-like attachment member may be provided separately from the extruded weatherstrip body as disclosed in Japanese Unexamined Patent Publication No. 2003-80951. However, it is not recommended that such an attachment member be provided, because another problem occurs. Specifically, as long as the weatherstrip is an extruded product, it is not complicated to design the shape of the molded part (i.e., to prepare a drawing of the shape) unlike Japanese Unexamined Patent Publication No. 2003-72386 and Japanese Utility Model Registration No. 2568228. However, it is difficult for the weatherstrip and the elongated-plate-like attachment member, which are both linear, to follow a surface of a vehicle body having a small curvature.

In view of the foregoing background, it is therefore an object of the present disclosure to use an attachment member not only to fix a weatherstrip but also to close a core removal hole with a portion of the attachment member to eliminate the need for closing the core removal hole with an adhesive, and to facilitate designing a weatherstrip including a hollow portion.

In order to achieve the object, according to an embodiment of the present disclosure, a portion of a peripheral wall of a hollow portion receiving a compression load when a door is closed has a core removal hole, into which a portion of an attachment member for fixing a weatherstrip is inserted, thereby closing the core removal hole.

A first aspect of the disclosure provides a weatherstrip fixing structure for fixing, to a door of a vehicle or a vehicle body, a weatherstrip configured to seal a gap between the door and an edge of an opening of the vehicle body. The weatherstrip includes: a weatherstrip intermediate molded part having a hollow portion made of an elastic material, the hollow portion being compressed by the door and the vehicle body to be elastically deformed when the door is closed; and an attachment member configured to fix the weatherstrip intermediate molded part to the door or the vehicle body, and made of a material harder than the elastic material forming the hollow portion. A portion of a peripheral wall of the hollow portion receiving a compression load when the door is closed has a slit-shaped core removal hole through which a core member used to mold the inner surface of the hollow portion is removed from the hollow portion. The attachment member has an insertion plate portion to be inserted into the core removal hole. A thickness of the insertion plate portion is set to be substantially equal to a width of an opening of the core removal hole.

According to this configuration, if the door is closed with the weatherstrip intermediate molded part fixed to, for example, the door through the attachment member, the hollow portion of the weatherstrip intermediate molded part is compressed by the door and the edge of the opening of the vehicle body so as to be elastically deformed. At this time, the insertion plate portion of the attachment member receives a compression load while being inserted into the core removal hole of the hollow portion. Thus, the core removal hole is closed by the insertion plate portion, and the width of the opening of the core removal hole is maintained by the thickness of the insertion plate portion. Since the thickness of the insertion plate portion is previously set to be substantially equal to the width of the opening of the core removal hole, the width of the opening of the core removal hole hardly varies as compared with the width of the opening of the core removal hole that has just been formed. This eliminates the need for determining the shape and size of the hollow portion in consideration of the anticipated shape and size of the hollow portion obtained after the core removal hole has been closed, unlike the known example in which the core removal hole is closed with an adhesive.

In addition, inserting the insertion plate portion into the core removal hole allows the core removal hole to be closed. This eliminates the need for closing the core removal hole with an adhesive, and prevents the appearance of the weatherstrip from be degraded.

According to a second aspect of the disclosure which is an embodiment of the first aspect of the disclosure, the peripheral wall of the hollow portion may have a fastening hole, and the attachment member may have a fastening portion to be inserted into, and fastened into, the fastening hole.

According to this configuration, the attachment member and the peripheral wall of the hollow portion are integrated together. This effectively reduces the degree of opening of the core removal hole.

According to a third aspect of the disclosure which is an embodiment of the second aspect of the disclosure, the weatherstrip may be fixed to the door. The peripheral wall of the hollow portion may include a fixing plate portion extending along a fixing surface of the door on which the weatherstrip is fixed, and a curved wall portion continuous with the fixing plate portion and curved away from the fixing plate portion to be in contact with the vehicle body. The core removal hole may open between the fixing plate portion and the curved wall portion. The attachment member may include a substrate portion arranged inside the hollow portion to extend along the fixing plate portion, and an engagement protrusion protruding from the substrate portion through the fixing plate portion toward an outside of the hollow portion. The engagement protrusion may be inserted into, and engaged with, an engagement hole of the door. The fastening hole may be formed in the curved wall portion.

According to this configuration, while the substrate portion of the attachment member is arranged inside the hollow portion of the weatherstrip intermediate molded part, the engagement protrusion of the attachment member passes through the fixing plate portion of the hollow portion, and is inserted into, and engaged with, the engagement hole of the door. Thus, the weatherstrip is fixed to the door. At this time, the fastening portion of the attachment member is fastened into the engagement hole of the curved wall portion of the hollow portion. This reliably reduces the degree of opening of the core removal hole between the curved wall portion and the fixing plate portion.

According to a fourth aspect of the disclosure which is an embodiment of the third aspect of the disclosure, the substrate portion of the attachment member may extend along the fixing plate portion of the hollow portion. The substrate portion of the attachment member may include a fixing plate portion-side fastening portion protruding from the substrate portion so as to be fastened to the fixing plate portion.

Specifically, the door has portions where it is difficult to form an engagement hole for the attachment member. In this case, the number of portions of the attachment member to be fixed to the door decreases. Thus, a portion of the fixing plate portion of the hollow portion may be easily separated from the door. However, according to this aspect of the disclosure, the fixing plate portion-side fastening portion of the substrate portion of the attachment member is fastened to the fixing plate portion of the hollow portion, thereby connecting the attachment member and the hollow portion through a portion of the door other than the engagement hole. This allows the attachment member to effectively reduce the degree to which the fixing plate portion of the hollow portion is separated from the door.

According to a fifth aspect of the disclosure which is an embodiment of the fourth aspect of the disclosure, a portion of the substrate portion including the fixing plate portion-side fastening portion may be more distant from the fixing surface of the door than a portion of the substrate portion including the engagement protrusion is.

Specifically, the fixing plate portion-side fastening portion protrudes from the substrate portion toward the door. This aspect of the disclosure may reduce the amount of the fixing plate portion-side fastening portion protruding toward the door. This makes it difficult for the fixing plate portion-side fastening portion to hinder the weatherstrip from being fixed.

According to a sixth aspect of the disclosure which is an embodiment of the first aspect of the disclosure, the insertion plate portion of the attachment member may extend from the substrate portion of the attachment member inside the hollow portion. A thickness of the substrate portion may be set to be larger than that of the insertion plate portion.

Specifically, suppose the thickness of the insertion plate portion is set to be substantially equal to the width of the opening of the core removal hole in a situation where the width of the opening of the core removal hole is small. In that case, the rigidity of the attachment member may decrease, and the strength with which the weatherstrip is attached may thus decrease. According to this aspect of the disclosure, the substrate portion of the attachment member inside the hollow portion is thicker than the insertion plate portion. Thus, even if the width of the opening of the core removal hole is small, the substrate portion allows the attachment member to be sufficiently rigid.

According to the first aspect of the disclosure, a portion of a peripheral wall of a hollow portion receiving a compression load has a core removal hole, into which an insertion plate portion of an attachment member for fixing a weatherstrip intermediate molded part is inserted, and the thickness of the insertion plate portion is set to be substantially equal to the width of an opening of the core removal hole. Thus, the attachment member may be used not only to fix the weatherstrip intermediate molded part but also to close the core removal hole. This may eliminate the need for closing the core removal hole with an adhesive unlike the known art, and may facilitate designing a weatherstrip including a hollow portion.

According to the second aspect of the disclosure, a fastening portion of the attachment member is inserted into, and fastened into, a fastening hole of the peripheral wall of the hollow portion. Thus, the attachment member and the peripheral wall of the hollow portion may be integrated together. This may effectively reduce the degree of opening of the core removal hole.

According to the third aspect of the disclosure, the fastening portion of the attachment member is fastened into an engagement hole of a curved wall portion of the hollow portion with the weatherstrip fixed to a door. This may allow the attachment member to reliably reduce the degree of opening of the core removal hole.

According to the fourth aspect of the disclosure, a substrate portion of the attachment member includes a fixing plate portion-side fastening portion to be fastened to a fixing plate portion of the hollow portion. Thus, if the door has portions where it is difficult to form the engagement hole for the attachment member, and the number of portions of the attachment member to be fixed to the door decreases, the degree to which the fixing plate portion of the hollow portion is separated from the door may be reduced.

According to the fifth aspect of the disclosure, a portion of the substrate portion including the fixing plate portion-side fastening portion is separated from a fixing surface of the door. This may reduce the amount of the fixing plate portion-side fastening portion protruding toward the door, and may prevent the fixing plate portion-side fastening portion from hindering the weatherstrip from being fixed.

According to the sixth aspect of the disclosure, the substrate portion of the attachment member is thicker than the insertion plate portion. This allows the attachment member to be sufficiently rigid even if the width of the opening of the core removal hole is small.

DETAILED DESCRIPTION

Embodiments of the present disclosure will now be described with reference to the accompanying drawings. Note that the following description of embodiments is merely illustrative in nature, and is not intended to limit the scope, application, or uses of the present disclosure.

(Configuration for Rear Door)

Figure 1:
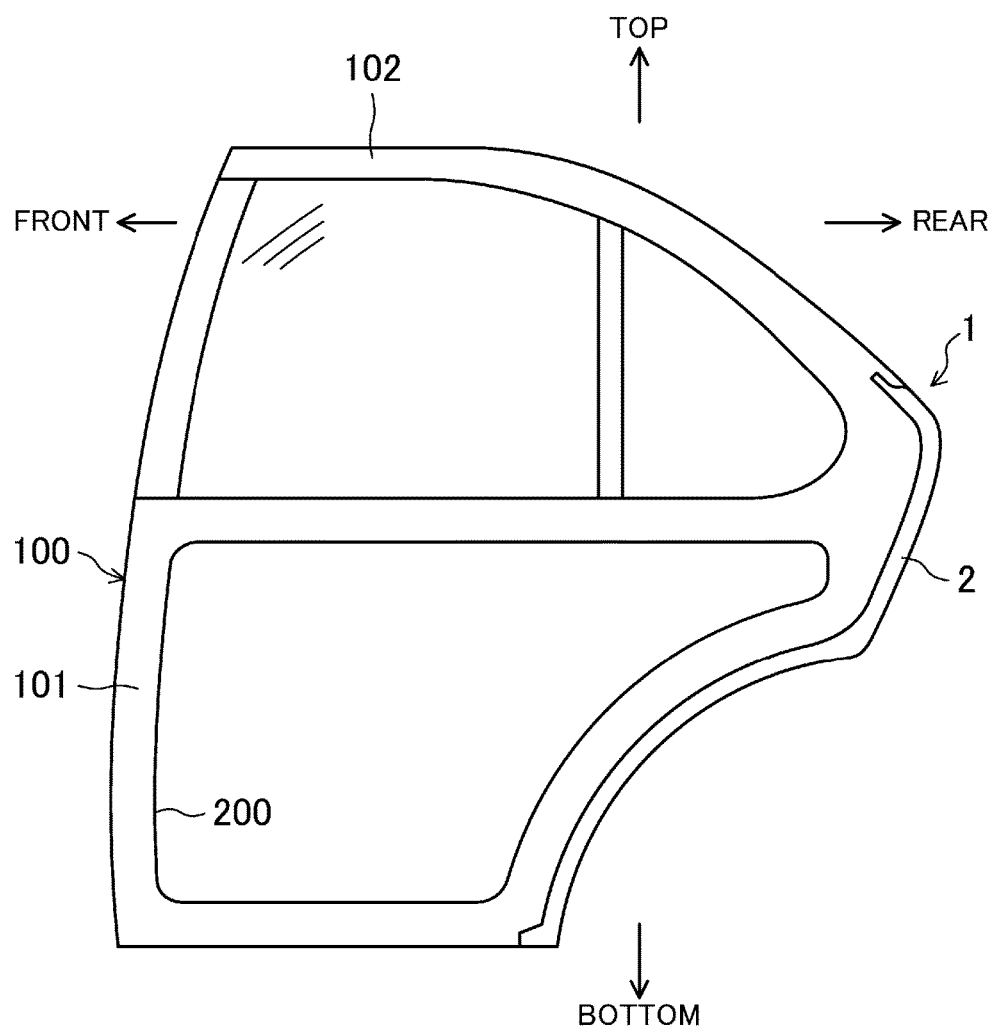
FIG. 1 is a side view of a right rear door including a weatherstrip fixing structure according to an exemplary embodiment as viewed from inside a vehicle.
Figure 4:
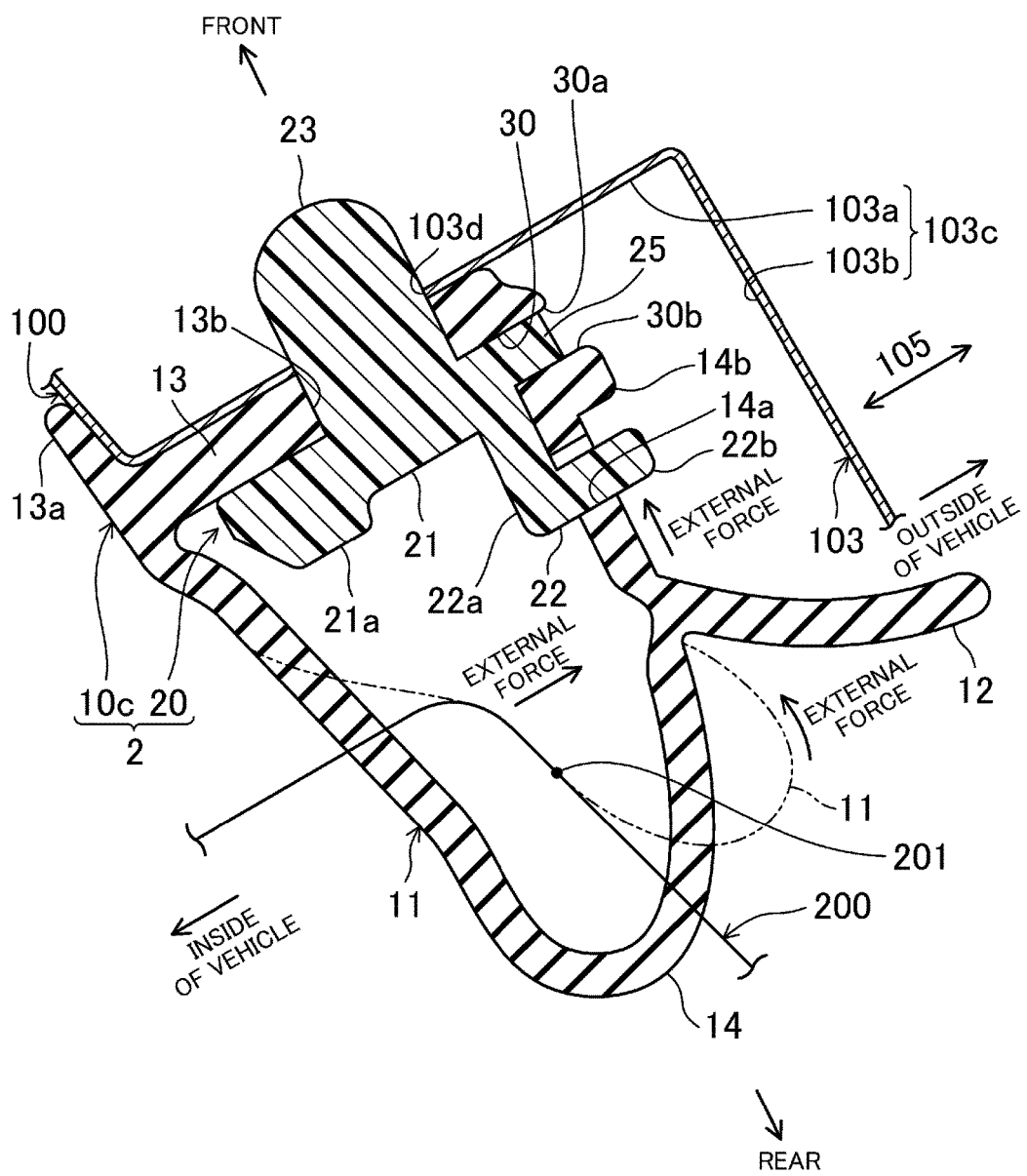
FIG. 4 is a cross-sectional view taken along the plane IV-IV shown in FIG. 3.

FIG. 1 is a side view of a right rear door 100 including a weatherstrip fixing structure 1 according to an exemplary embodiment of the present disclosure as viewed from inside a vehicle. The rear door 100 is used to open and close a loading and unloading opening 201 of a side portion of an automobile serving as a vehicle. In FIG. 4, the reference numeral 200 is used to designate a panel forming a portion of the automobile. This panel is a portion of a vehicle body made of a steel sheet. In the description of this embodiment, for easy understanding, the front side of the vehicle is simply referred to as "front," and the rear side of the vehicle is simply referred to as "rear."

Although not shown, a front portion of the rear door 100 is coupled to a center pillar of the vehicle body through hinges each having a rotating shaft extending vertically. The rear door 100 rotates around the rotating shafts to open and close the opening 201. In FIG. 4, the reference numeral 105 is used to designate an approximate rotation path of the rear door 100 through which it opens and closes.

As shown in FIG. 1, the rear door 100 includes a door body 101 forming a substantially lower half portion of the rear door 100, and a sash 102 forming a substantially upper half portion of the rear door 100. The weatherstrip fixing structure 1 according to an exemplary embodiment of the present disclosure is mounted on a rear portion of the rear door 100 to fix, to the rear door 100, a weatherstrip 2 sealing the gap between the rear portion of the rear door 100 and the edge of the opening 201 of the vehicle body.

In the following description of this embodiment, the weatherstrip fixing structure 1 is supposed to be used for the rear door 100. However, this is merely an example of the present disclosure. The weatherstrip fixing structure 1 may be used for a front door and a hatch back door, for example. The weatherstrip 2 may have substantially the same structure even when fixed to a panel of the vehicle body instead of to the doors.

As shown in FIG. 4, the rear door 100 includes an inner panel 103 forming the surface of the door body 101 inside the vehicle. A rear portion of the inner panel 103 is provided with a step portion 103c consisting of a first plate portion 103a and a second plate portion 103b. The first plate portion 103a extends toward the outside of the vehicle. The first plate portion 103a has a plurality of engagement holes 103d for fixing the weatherstrip 2. The engagement holes 103d are vertically spaced apart from each other. In this embodiment, it is difficult to freely form the engagement holes 103d in a region of the first plate portion 103a on which an attachment member 20 to be described below is arranged. Thus, the first plate portion 103a has a portion where two adjacent ones of the engagement holes 103d are so widely spaced apart from each other (e.g., by a distance longer than or equal to 15 cm). In other words, the attachment member 20 is arranged on the portion where two adjacent ones of the engagement holes 103d are widely spaced apart from each other. Since the entire lengths of upper and lower molded parts 10a and 10e are shorter than that of an intermediate molded part 10c, the distance between the points at which the attachment member 20 for attachment of the molded parts 10a, 10c, and 10e is attached to the vehicle body is less than 15 cm. Thus, a core removal structure and a fixing structure which have been known may be used to fix the upper and lower molded parts 10a and 10e.

The second plate portion 103b extends from the rear edge of the first plate portion 103a toward the rear of the vehicle, and is inclined rearward toward the inside of the vehicle. The shape of the inner panel 103 is an example, and may form a shape other than the shape described above.

(Configuration for Weatherstrip)

Figure 2:
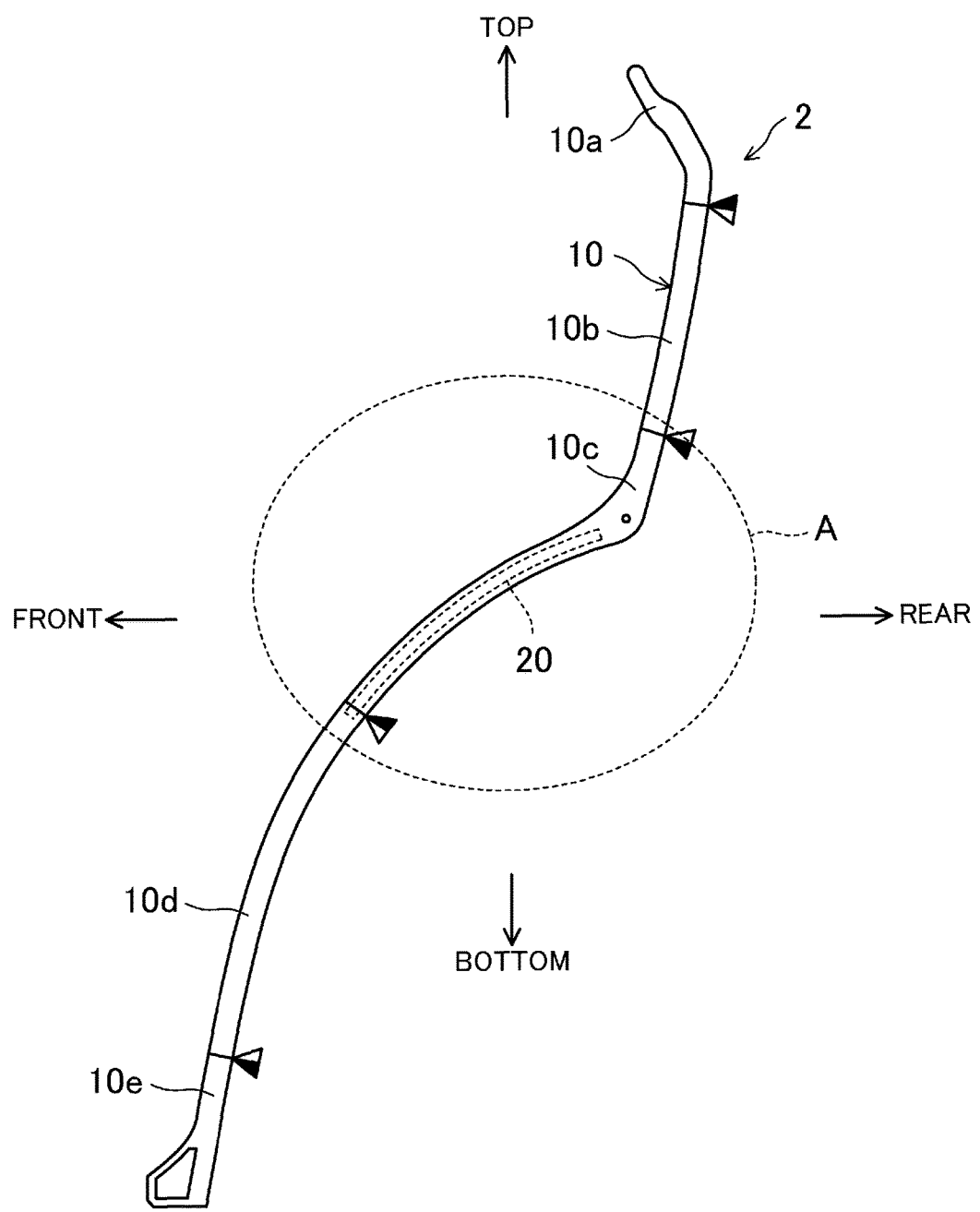
FIG. 2 is a side view of a weatherstrip as viewed from inside the cabin.
Figure 3:
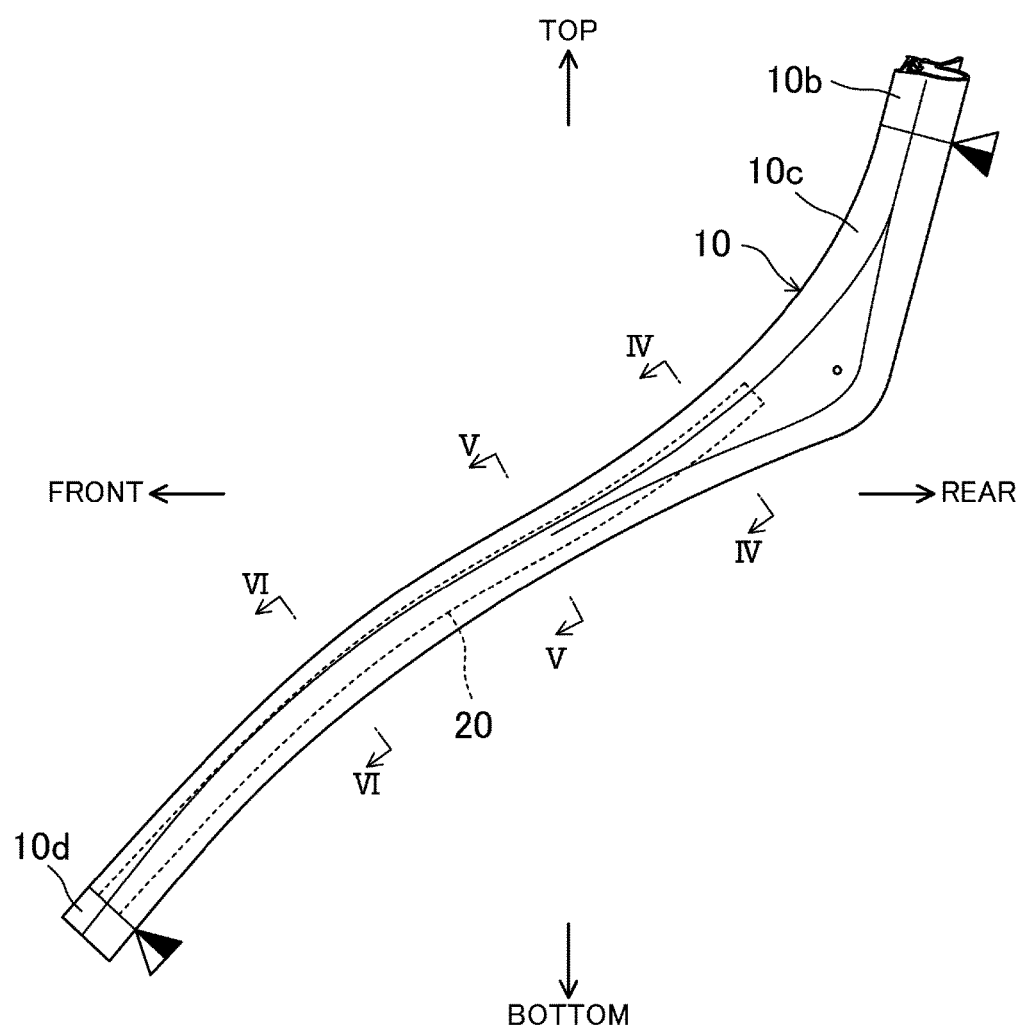
FIG. 3 is an enlarged view of the portion A shown in FIG. 2.

As shown in FIGS. 2 and 3, the weatherstrip 2 includes a weatherstrip body 10 made of an elastic material in its entirety, and an attachment member 20 made of a material harder than the elastic material. The weatherstrip body 10 and the attachment member 20 form the weatherstrip fixing structure 1. Examples of the elastic material include synthetic rubbers and thermoplastic elastomers (TPE). Examples of the synthetic rubbers include an EPDM rubber. Examples of the thermoplastic elastomers (TPE) include olefinic thermoplastic elastomers (TPO). It is recommended that to increase flexibility, these materials be foamed to be used as a sponge material. Examples of a material forming the attachment member 20 include resins, such as polyacetal (POM), polypropylene (PP), and nylon. However, the material may be a metal or any other suitable material.

As shown in FIG. 1, the weatherstrip 2 extends in a top-to-bottom direction along a rear edge portion of the rear door 100, and is partially bent along the rear edge portion of the rear door 100 as viewed from the side. Also, the weatherstrip 2 is fixed to the surface of the rear edge portion of the rear door 100 closer to the inside of the vehicle, and is covered with the rear door 100. Thus, the weatherstrip 2 is hardly visible from outside the vehicle. In this embodiment, a portion of the weatherstrip 2 shown in FIG. 3 will be described in detail. However, the other portions of the weatherstrip 2 may also have substantially the same configuration as the portion thereof shown in FIG. 3. Optionally, portions of the weatherstrip 2 other than the portion thereof shown in FIG. 3 may be fixed to the rear door 100 by a known technique.

(Configuration for Weatherstrip Intermediate Molded Part)

The triangular patterns shown in FIGS. 2 and 3, each having white and black portions, each indicate the boundary between an extruded part and a molded part of the weatherstrip body 10. Specifically, a part of the weatherstrip closer to the white portion of each pattern is the extruded part of the weatherstrip, and a part thereof closer to the black portion of the pattern is the molded part thereof. The reference characters 10a, 10c, and 10e are respectively used to designate an upper molded part, an intermediate molded part, and a lower molded part. The reference characters 10b and 10d are used to designate extruded parts.

The weatherstrip intermediate molded part 10c is obtained by molding a material with molds although not shown. The weatherstrip intermediate molded part 10c includes a hollow portion 11 and a lip portion 12 although shown only in FIGS. 4-6. The hollow portion 11 is elongated to extend continuously from the upper end (one end) of the weatherstrip body 10 to the lower end (the other end) thereof. As shown in FIG. 4, the hollow portion 11 comes into contact with the vehicle body panel 200 with the rear door 100 closed, and is compressed by the rear door 100 and the vehicle body panel 200 to be elastically deformed as indicated by the phantom line shown in FIG. 4. While no external force acts on the hollow portion 11, the hollow portion 11 has a horizontal cross-sectional shape extending in the longitudinal direction of the vehicle as shown in FIG. 4, and its size in the inside-outside direction of the cabin is set to decrease toward the rear end of the vehicle.

A peripheral wall of the hollow portion 11 includes a fixing plate portion 13 and a curved wall portion 14. The fixing plate portion 13 extends substantially in the inside-outside direction of the cabin along the first plate portion 103a forming the fixing surface of the rear door 100 on which the weatherstrip 2 is fixed. The curved wall portion 14 is continuous with the fixing plate portion 13, and is curved toward the rear end of the vehicle so as to extend away from the fixing plate portion 13, thus allowing the curved wall portion 14 to come into contact with the vehicle body panel 200. The fixing plate portion 13 and the curved wall portion 14 are integrated together.

The fixing plate portion 13 is partially in close contact with the first plate portion 103a of the rear door 100 while being fixed to the rear door 100. A front edge portion of the fixing plate portion 13 reaches a front edge portion of the first plate portion 103a, and is provided with a protrusion 13a protruding toward the outside of the vehicle and extending substantially in the top-to-bottom direction. This protrusion 13a is formed along the front edge portion of the first plate portion 103a, and is used to position the weatherstrip body 10 in the front-rear direction thereof. A rear edge portion of the fixing plate portion 13 is apart forward from the second plate portion 103b. Thus, a clearance is created between the fixing plate portion 13 and the second plate portion 103b.

Figure 6:
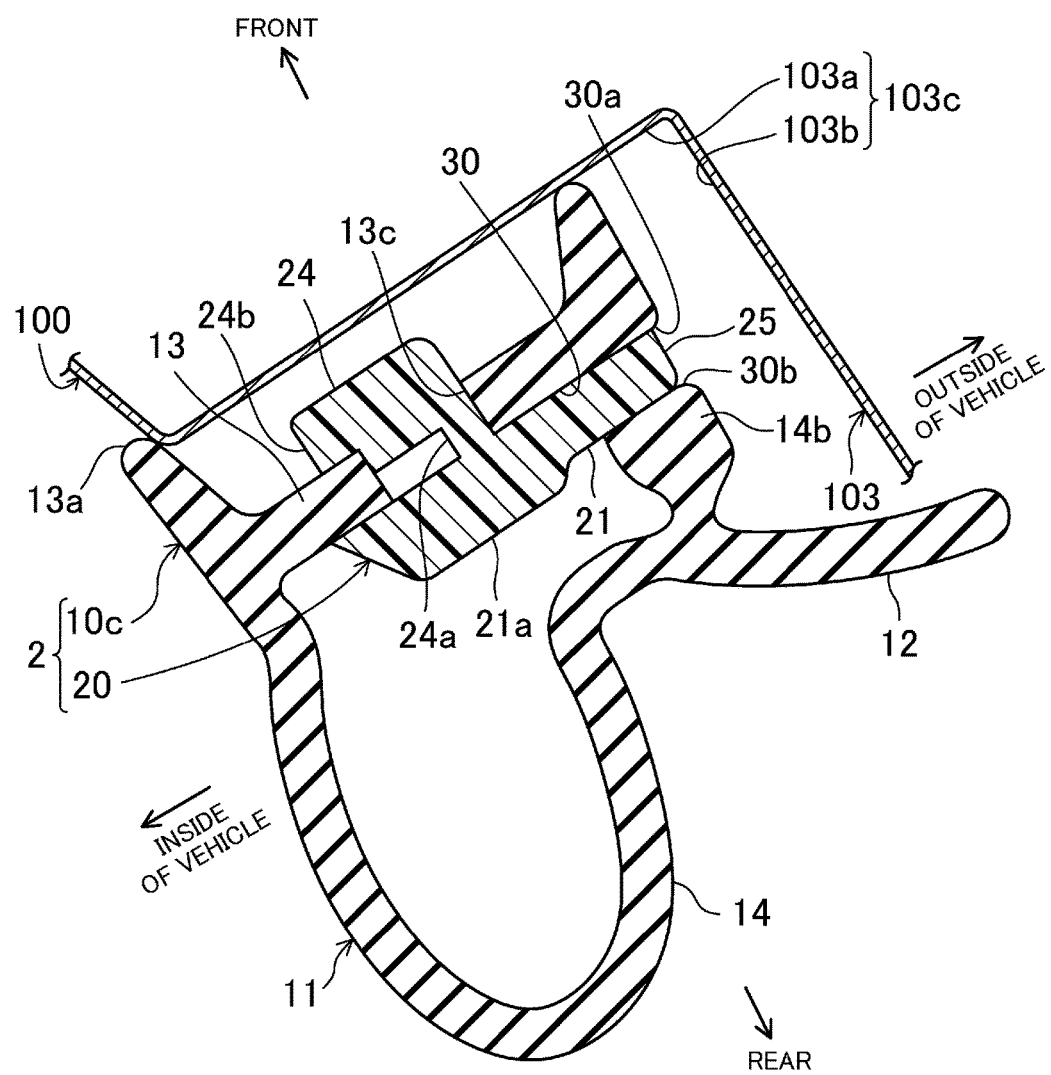
FIG. 6 is a cross-sectional view taken along the plane VI-VI shown in FIG. 3.

As shown in FIG. 4, the fixing plate portion 13 has an upper fixing through hole 13b and a lower fixing through hole (not shown) each facing an associated one of the engagement holes 103d of the rear door 100. Although only the upper fixing through hole 13b is shown in FIG. 4, the two fixing through holes are vertically spaced apart from each other in the fixing plate portion 13. Engagement protrusions 23 of the attachment member 20 are each inserted into, and run through, an associated one of these fixing through holes. As shown in FIG. 6, a portion of the fixing plate portion 13 between the upper fixing through hole 13b (shown in FIG. 4) and the lower fixing through hole (not shown) has intermediate through holes 13c. A hook (fixing plate portion-side fastening portion) 24 of the attachment member 20 to be described below is fastened into one of the intermediate through holes 13c.

As shown in FIG. 4, the curved wall portion 14 extends from the front edge portion of the fixing plate portion 13 toward the rear of the vehicle, and is then curved to extend toward the front of the vehicle. A portion of the curved wall portion 14 closer to the outside of the vehicle is provided with the lip portion 12. This lip portion 12 extends toward the outside of the vehicle. The thickness of the curved wall portion 14 is set to be smaller than that of the fixing plate portion 13. A portion of the curved wall portion 14 outside the vehicle has a plurality of fastening holes 14a. The fastening holes 14a are spaced apart from each other in the longitudinal direction of the hollow portion 11, and at least one thereof is in the same position as an associated one of the fixing through holes 13b of the fixing plate portion 13 in the longitudinal direction of the hollow portion 11. A portion of the curved wall portion 14 closer to the outside of the vehicle than the fastening holes 14a are is provided with a projection 14b projecting outward of the hollow portion 11 and extending along the longitudinal direction of the hollow portion 11.

As described above, the weatherstrip intermediate molded part 10c is a molded product. Thus, although not shown, a mold for molding the outer surface of the hollow portion 11 and a mold (core member) for molding the inner surface of the hollow portion 11 are used to mold the hollow portion 11. The core member includes an inner surface molding portion for molding the inner surface of the hollow portion 11, and a supporting portion (a root portion of the core member) for supporting the inner surface molding portion. The presence of the supporting portion allows the peripheral wall of the hollow portion 11 to have a slit-shaped core removal hole 30 formed somewhere along the circumferential direction of the peripheral wall when the core member is removed from the hollow portion 11. The core removal hole 30 has an opening with a width equal to the thickness of the supporting portion. That is to say, the core removal hole 30 is used to pull the core member out of the hollow portion 11 after the weatherstrip intermediate molded part 10c has been molded.

In this embodiment, a portion of the peripheral wall of the hollow portion 11 receiving a compression load with the rear door 100 closed has the core removal hole 30. Specifically, when the rear door 100 is closed, the hollow portion 11 is sandwiched between the rear door 100 and the vehicle body panel 200 as indicated by the phantom line shown in FIG. 4 so that, mainly, the curved wall portion 14 is deformed. At this time, external forces act on the curved wall portion 14 so that a rear portion of the curved wall portion 14 is pressed against the fixing plate portion 13. Thus, portions of the weatherstrip body 10 receiving a compression load with the rear door 100 closed are the rear portion of the curved wall portion 14 and a rear portion of the fixing plate portion 13. The core removal hole 30 is formed between the rear portion of the curved wall portion 14 and the rear portion of the fixing plate portion 13. Thus, one edge 30a of the core removal hole 30 is defined by the rear portion of the fixing plate portion 13, and the other edge 30b thereof is defined by the projection 14b of the curved wall portion 14. When the rear door 100 is closed, the other edge 30b is displaced closer to the one edge 30a.

(Configuration for Attachment Member)

Figure 5:
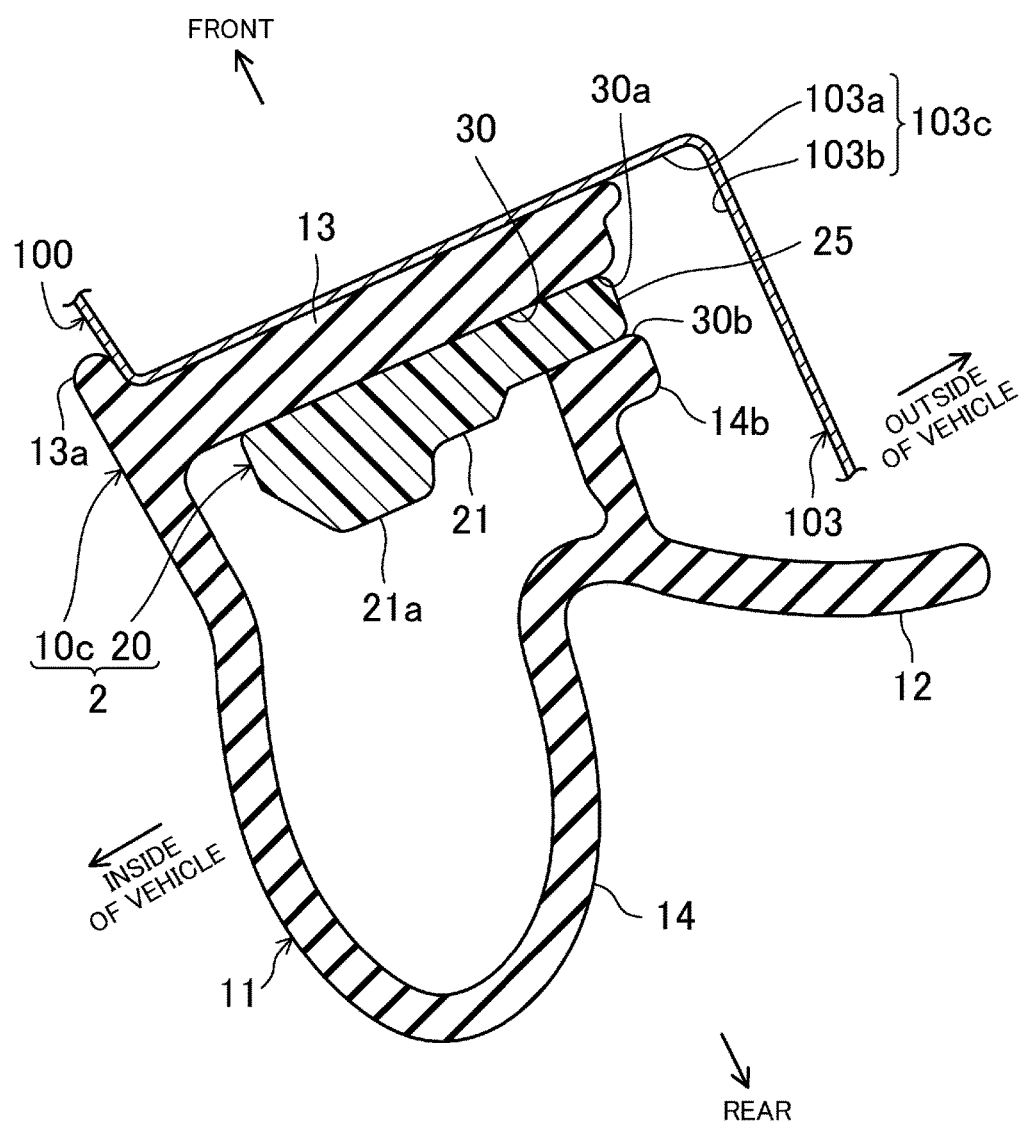
FIG. 5 is a cross-sectional view taken along the plane V-V shown in FIG. 3.
Figure 7:
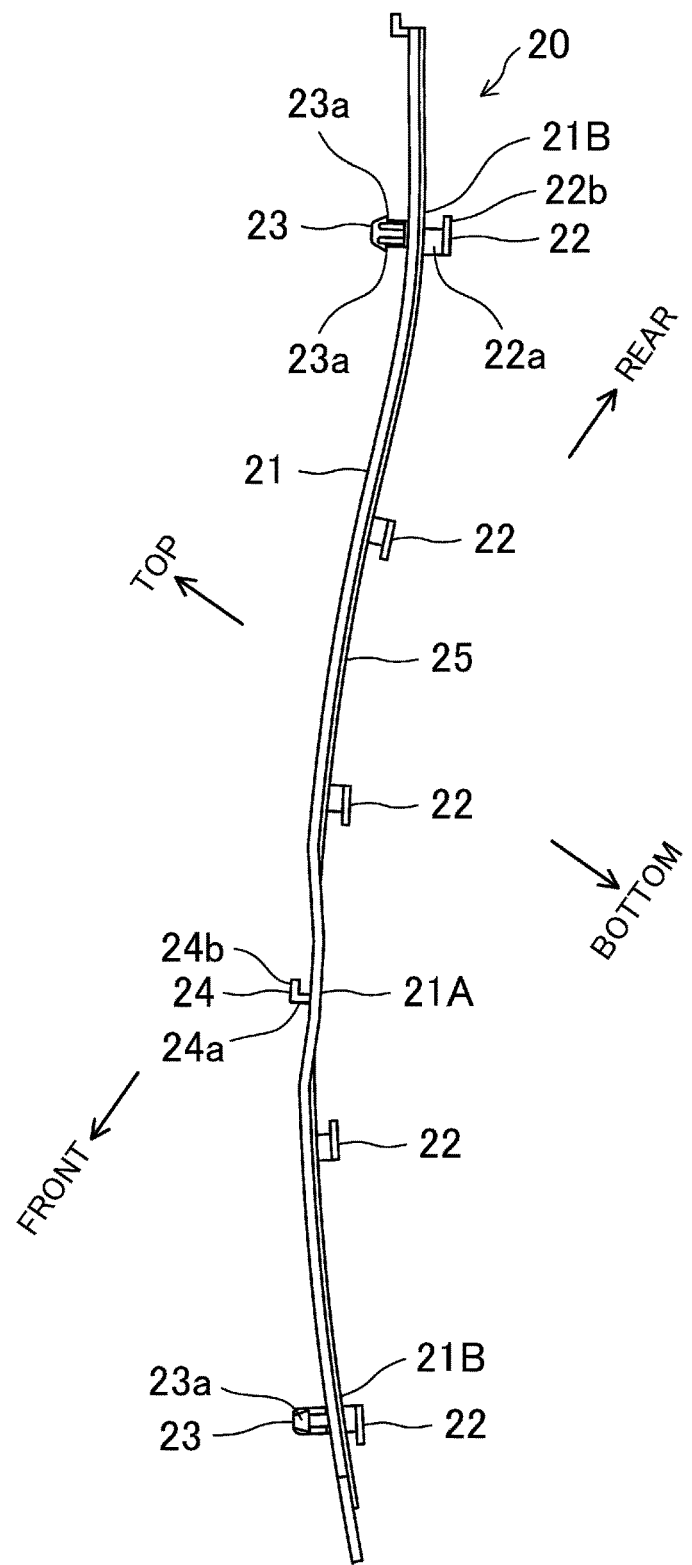
FIG. 7 is a side view of an attachment member.
Figure 8:
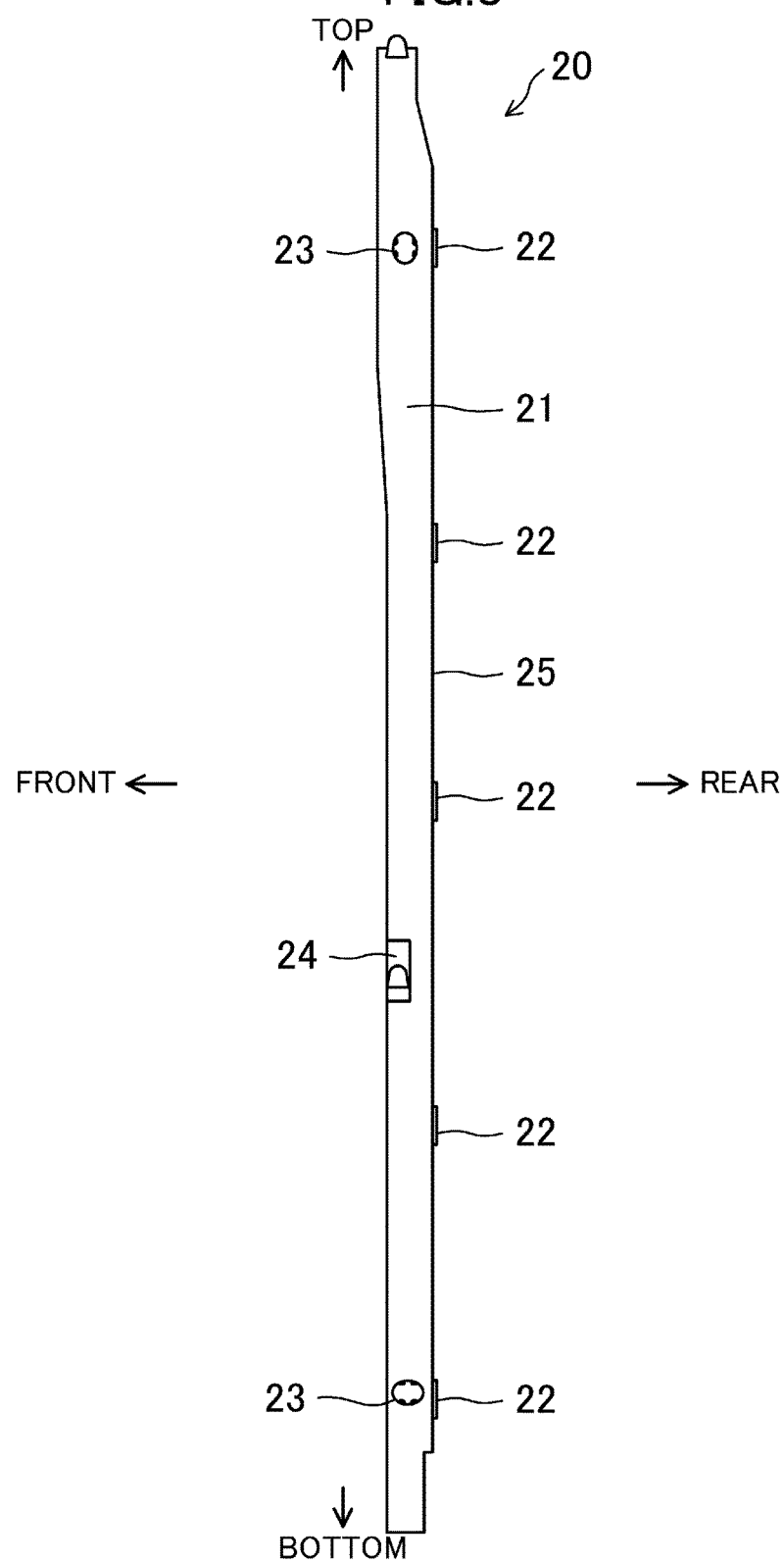
FIG. 8 shows the attachment member as viewed from outside the vehicle.
Figure 9:
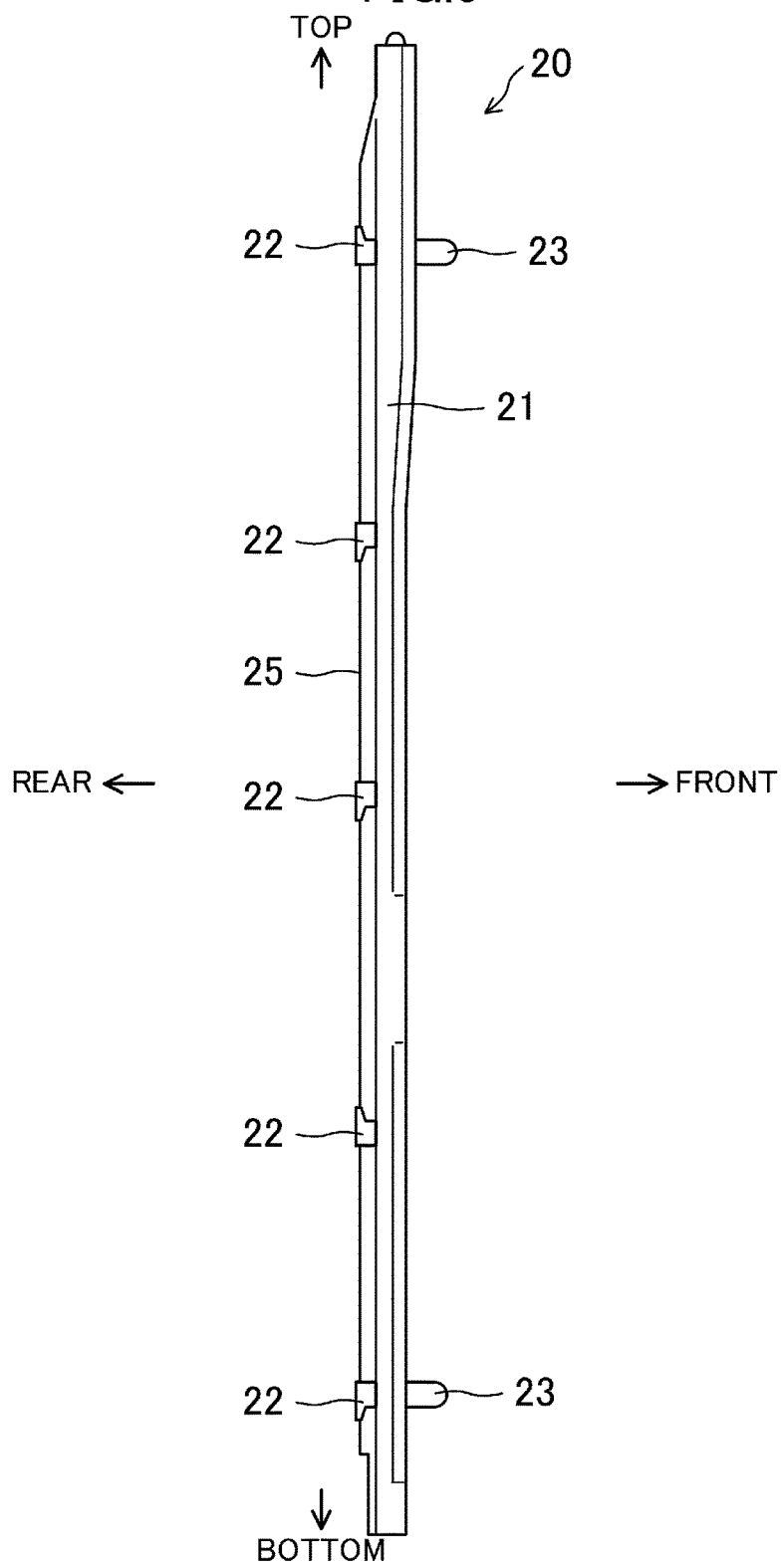
FIG. 9 shows the attachment member as viewed from inside the vehicle.

Each attachment member 20 forms a plate shorter than the hollow portion 11 so as to be disposed only on a predetermined region of the hollow portion 11 in the longitudinal direction thereof as indicated by the broken line shown in FIG. 3. The attachment member 20 is used to fix the weatherstrip intermediate molded part 10c to the rear door 100. As shown in FIGS. 7-9, the attachment member 20 includes a substrate portion 21, fastening portions 22, the engagement protrusions 23, and the hook 24. As shown in FIG. 4, the substrate portion 21 is arranged inside the hollow portion 11, and extends while conforming to the shape of the fixing plate portion 13 of the hollow portion 11. As shown in FIG. 7, the substrate portion 21 is bent to conform to the shape of the first plate portion 103a of the rear door 100. As shown in FIGS. 4-6, the substrate portion 21 is provided with an insertion plate portion 25 to be inserted into the core removal hole 30. The insertion plate portion 25 extends from an edge of the substrate portion 21 in the lateral direction thereof. The thickness of the insertion plate portion 25 is set to be substantially equal to the width of the opening of the core removal hole 30 (the distance between the one edge 30a and the other edge 30b). The width of the opening of the core removal hole 30 is that of the opening on which no external force acts, and is substantially the same as the thickness of the root portion of the core member.

The situations where the thickness of the insertion plate portion 25 is "substantially equal" to the width of the opening of the core removal hole 30 include not only a situation where the thickness of the insertion plate portion 25 is exactly the same as the width of the opening of the core removal hole 30, but also a situation where there occurs a difference therebetween that is small enough to be negligible in consideration of molding errors and other errors which may usually be caused by molding a resin or rubber in the form of a vehicle part. For example, if the difference between the thickness of the insertion plate portion 25 and the width of the opening of the core removal hole 30 falls within 5% of the thickness of the insertion plate portion 25, the thickness of the insertion plate portion 25 can be said to be substantially equal to the width of the opening of the core removal hole 30, and advantages of this embodiment to be described below may be provided.

As shown in FIG. 4, the thickness of the substrate portion 21 is set to be larger than that of the insertion plate portion 25. Thus, for example, if the width of the opening of the core removal hole 30 is so small that the thickness of the insertion plate portion 25 has to be reduced, the substrate portion 21 may increase the rigidity of the attachment member 20. In addition, as shown in FIG. 4 and other figures, the surface of the substrate portion 21 closer to the inside of the vehicle is provided with a rib 21a. This rib 21a extends in the longitudinal direction of the substrate portion 21.

As shown in FIG. 4, the fastening portions 22 are each fixed by being inserted into an associated one of the fastening holes 14a of the hollow portion 11 of the weatherstrip intermediate molded part 10c. Each fastening portion 22 includes a base portion 22a protruding from the surface of the substrate portion 21 closer to the inside of the vehicle, and a tip end portion 22b protruding from a tip end portion of the base portion 22a in a direction orthogonal to the direction of protrusion of the base portion 22a. The tip end portion 22b is inserted into the associated fastening hole 14a from inside the hollow portion 11 toward outside so as to be fastened into that fastening hole 14a, thereby integrating the curved wall portion 14 of the hollow portion 11 and the attachment member 20 together. The length of the tip end portion 22b is set such that the tip end portion 22b protrudes through that fastening hole 14a toward the outside of the hollow portion 11.

As shown in FIG. 7, the upper engagement protrusion 23 and the uppermost fastening portion 22 are in the same position in the longitudinal direction of the attachment member 20. The lower engagement protrusion 23 and the lowermost fastening portion 22 are also in the same position in the longitudinal direction of the attachment member 20. Thus, the curved wall portion 14 of the hollow portion 11 may be fastened to the attachment member 20 in the vicinity of the engagement protrusions 23.

As shown in FIG. 4, the engagement protrusions 23 protrude through the fixing plate portion 13 of the hollow portion 11 of the weatherstrip intermediate molded part 10c toward the outside of the hollow portion 11 (toward the front of the vehicle), and are inserted into, and engaged with, the associated engagement holes 103d of the rear door 100. As shown in FIG. 7, a tip end portion of each engagement protrusion 23 in the direction of protrusion thereof is provided with a nail 23a. This nail 23a is inserted into the associated engagement hole 103d of the rear door 100, and then gets engaged with that engagement hole 103d so as to be caught in the edge of the engagement hole 103d.

The hook 24 shown in FIG. 6 and other figures is a fixing plate portion-side fastening portion according to an embodiment of the present disclosure. The hook 24 protrudes from the surface of the substrate portion 21 closer to the outside of the vehicle, and is fastened to the fixing plate portion 13 of the hollow portion 11 of the weatherstrip intermediate molded part 10c. The hook 24 includes a base portion 24a protruding from the surface of the substrate portion 21 closer to the outside of the vehicle, and a tip end portion 24b protruding from a tip end portion of the base portion 24a in a direction orthogonal to the direction of protrusion of the base portion 24a. The tip end portion 24b is inserted into the intermediate through hole 13c of the fixing plate portion 13 from inside the hollow portion 11 toward outside to protrude toward the outside of the hollow portion 11. Thus, the tip end portion 24b is fastened to the fixing plate portion 13 from outside the hollow portion 11, thereby integrating the fixing plate portion 13 of the hollow portion 11 and the attachment member 20 together.

As shown in FIG. 7, a portion 21A of the substrate portion 21 including the hook 24 is located closer to the rear of the vehicle than portions 21B, 21B of the substrate portion 21 each of which includes the engagement protrusion 23 and obliquely below the portions 21B, 21B. In other words, the portion 21A is away from the first plate portion 103a of the rear door 100 (shown in FIGS. 4-6). This may reduce the amount of the hook 24 protruding toward the rear door 100. This makes it difficult for the hook 24 to hinder the weatherstrip 2 from being fixed.

(Advantages of Embodiment)

Next, advantages of this embodiment will be described. Before the weatherstrip 2 is fixed to the rear door 100, the attachment member 20 is assembled to the weatherstrip intermediate molded part 10c. To assemble the attachment member 20, the attachment member 20 is inserted into the hollow portion 11 from the core removal hole 30 of the weatherstrip intermediate molded part 10c.

Thereafter, as shown in FIG. 4, the engagement protrusions 23 of the attachment member 20 are inserted into the associated engagement holes 103d of the weatherstrip intermediate molded part 10c, and the fastening portions 22 are fastened into the associated fastening holes 14a of the weatherstrip intermediate molded part 10c. As shown in FIG. 6, the hook 24 is inserted into one of the intermediate through holes 13c of the weatherstrip intermediate molded part 10c to be caught in the edge of that intermediate through hole 13c. The insertion plate portion 25 of the attachment member 20 is inserted into the core removal hole 30 to close the core removal hole 30. This eliminates the need for using an adhesive to close the core removal hole 30. The sequence of the operations described above is merely an example of the present disclosure.

Next, the weatherstrip 2 is fixed to the rear door 100. To fix the weatherstrip 2, the engagement protrusions 23 of the attachment member 20 are inserted into the associated engagement holes 103d of the rear door 100 to allow the nails 23a to get engaged with the edges of the associated engagement holes 103d as shown in FIG. 4. At this time, the upper engagement hole 103d is distant from the lower engagement hole (not shown). Thus, an intermediate portion of the weatherstrip intermediate molded part 10c may be separated from the rear door 100. However, in this embodiment, the rigid attachment member 20 may be arranged inside the hollow portion 11 to press the intermediate portion of the weatherstrip intermediate molded part 10c against the rear door 100. This prevents the intermediate portion of the weatherstrip intermediate molded part 10c from being separated from the rear door 100.

The intermediate portion of the weatherstrip intermediate molded part 10c is connected to the attachment member 20 through the hook 24. This may reduce the misalignment between the intermediate portion of the weatherstrip intermediate molded part 10c and the attachment member 20. This may also reduce the degree to which the weatherstrip intermediate molded part 10c is separated from the rear door 100. In addition, the fastening portion 22 of the attachment member 20 is fastened to the curved wall portion 14 of the weatherstrip intermediate molded part 10c. This prevents the core removal hole 30 from opening with the weatherstrip 2 fixed to the rear door 100.

The weatherstrip 2 is fixed to the rear door 100 in the foregoing manner. If the rear door 100 is closed, the hollow portion 11 is sandwiched between the rear door 100 and the vehicle body panel 200, so that the curved wall portion 14 and other portions are deformed, as indicated by the phantom line shown in FIG. 4. As a result, the curved wall portion 14 is in close contact with the rear door 100 and the vehicle body panel 200 to provide good sealability. At this time, compression loads act on a portion of the hollow portion 11 having the core removal hole 30 in the directions which are indicated by the arrows and in which external forces act. However, since the insertion plate portion 25 having a thickness substantially equal to the width of the opening of the core removal hole 30 is inserted into the core removal hole 30, the width of the opening of the core removal hole 30 hardly varies. This eliminates the need for anticipating how much the width of the opening of the core removal hole 30 varies to determine the shape and size of the hollow portion 11.

As can be seen from the foregoing description, the weatherstrip fixing structure 1 according to this embodiment includes the hollow portion 11 with the peripheral wall. A portion of the peripheral wall receiving a compression load has the core removal hole 30. The insertion plate portion 25 of the attachment member 20 is inserted into the core removal hole 30 to fix the weatherstrip intermediate molded part 10c. The thickness of the insertion plate portion 25 is set to be substantially equal to the width of the opening of the core removal hole 30. Thus, the attachment member 20 may be used not only to fix the weatherstrip intermediate molded part 10c but also to close the core removal hole 30. This may eliminate the need for closing the core removal hole 30 with an adhesive unlike the known art, and may facilitate designing a weatherstrip including the hollow portion 11.

The fastening portions 22 of the attachment member 20 are inserted into, and fastened into, the associated fastening holes 14a of the curved wall portion 14 of the hollow portion 11. This allows the attachment member 20 and the curved wall portion 14 to be integrated together. This may effectively reduce the degree of opening of the core removal hole 30.

The foregoing description of embodiments is merely an example in all aspects, and should not be construed to be limiting. All the modifications and changes which fall within the scope of equivalents of the appended claims are within the scope of the present disclosure.

As can be seen from the foregoing description, a weatherstrip fixing structure according to an embodiment of the present disclosure may be used for a rear door of a vehicle, for example.

What is claimed is:

1. A weatherstrip fixing structure for fixing, to a door of a vehicle or a vehicle body, a weatherstrip configured to seal a gap between the door and an edge of an opening of the vehicle body, the weatherstrip including:
  a weatherstrip intermediate molded part having a hollow portion made of an elastic material, the hollow portion being compressed by the door and the vehicle body to be elastically deformed when the door is closed; and
  an attachment member configured to fix the weatherstrip intermediate molded part to the door or the vehicle body, and made of a material harder than the elastic material forming the hollow portion, wherein
a portion of a peripheral wall of the hollow portion receiving a compression load when the door is closed has a slit-shaped core removal hole through which a core member used to mold the inner surface of the hollow portion is removed from the hollow portion,
the attachment member has an insertion plate portion to be inserted into the core removal hole, a thickness of the insertion plate portion is set to be substantially equal to a width of an opening of the core removal hole, the peripheral wall of the hollow portion has a fastening hole, the attachment member has a fastening portion to be inserted into, and fastened into, the fastening hole, the weatherstrip is fixed to the door, the peripheral wall of the hollow portion includes a fixing plate portion extending along a fixing surface of the door on which the weatherstrip is fixed, and a curved wall portion continuous with the fixing plate portion and curved away from the fixing plate portion to be in contact with the vehicle body, the core removal hole opens between the fixing plate portion and the curved wall portion, the attachment member includes a substrate portion arranged inside the hollow portion to extend along the fixing plate portion, and an engagement protrusion protruding from the substrate portion through the fixing plate portion toward an outside of the hollow portion, the engagement protrusion is inserted into, and engaged with, an engagement hole of the door, and the fastening hole is formed in the curved wall portion.

2. The weatherstrip fixing structure of claim 1, wherein the substrate portion of the attachment member extends along the fixing plate portion of the hollow portion, and the substrate portion of the attachment member includes a fixing plate portion-side fastening portion protruding from the substrate portion so as to be fastened to the fixing plate portion.

3. The weatherstrip fixing structure of claim 2, wherein a portion of the substrate portion including the fixing plate portion-side fastening portion is more distant from the fixing surface of the door than a portion of the substrate portion including the engagement protrusion is.

4. The weatherstrip fixing structure of claim 1, wherein the insertion plate portion of the attachment member extends from the substrate portion of the attachment member inside the hollow portion, and a thickness of the substrate portion is set to be larger than that of the insertion plate portion.

* * * * *